United States Patent
Hanneman

(10) Patent No.: US 7,409,272 B2
(45) Date of Patent: Aug. 5, 2008

(54) SYSTEMS AND METHODS FOR REMOVING UNDESIRED SIGNALS IN INSTRUMENT LANDING SYSTEMS

(75) Inventor: Charles K. Hanneman, Olathe, KS (US)

(73) Assignee: Honeywell International Inc., Morristown, NJ (US)

( * ) Notice: Subject to any disclaimer, the term of this patent is extended or adjusted under 35 U.S.C. 154(b) by 165 days.

(21) Appl. No.: 11/235,199

(22) Filed: Sep. 27, 2005

(65) Prior Publication Data

US 2007/0069942 A1    Mar. 29, 2007

(51) Int. Cl.
G01S 1/16 (2006.01)
G01S 1/18 (2006.01)

(52) U.S. Cl. ............... 701/17; 342/411; 342/413
(58) Field of Classification Search ............ None
See application file for complete search history.

(56) References Cited

U.S. PATENT DOCUMENTS

| | | | | |
|---|---|---|---|---|
| 3,483,560 A * | 12/1969 | Villiers | ............... | 342/413 |
| 3,671,967 A * | 6/1972 | Fries | ............... | 342/413 |
| 3,675,162 A * | 7/1972 | Owen et al. | ............... | 342/412 |
| 3,680,118 A * | 7/1972 | Anthony | ............... | 342/401 |
| 3,716,863 A * | 2/1973 | Ghose et al. | ............... | 342/413 |
| 3,716,864 A * | 2/1973 | Stover | ............... | 342/411 |
| 3,793,597 A * | 2/1974 | Toman | ............... | 332/108 |
| 3,808,558 A * | 4/1974 | Toman et al. | ............... | 332/108 |
| 3,820,115 A * | 6/1974 | Stone | ............... | 342/401 |
| 3,890,620 A * | 6/1975 | Toman et al. | ............... | 342/413 |
| 3,900,877 A * | 8/1975 | Kohler | ............... | 342/408 |
| 3,918,662 A * | 11/1975 | Vircks et al. | ............... | 360/1 |
| 4,012,739 A * | 3/1977 | Hofgen et al. | ............... | 342/413 |
| 4,414,632 A * | 11/1983 | Murrell | ............... | 702/70 |
| 4,586,049 A * | 4/1986 | Davidson | ............... | 342/414 |
| 4,833,725 A * | 5/1989 | Teetor | ............... | 455/67.13 |
| 5,323,165 A * | 6/1994 | Greving et al. | ............... | 342/413 |
| 5,323,332 A * | 6/1994 | Smith et al. | ............... | 702/106 |
| 5,786,773 A * | 7/1998 | Murphy | ............... | 340/947 |
| 5,859,878 A * | 1/1999 | Phillips et al. | ............... | 375/316 |
| 6,072,994 A * | 6/2000 | Phillips et al. | ............... | 455/84 |
| 6,469,654 B1 * | 10/2002 | Winner et al. | ............... | 342/33 |
| 2007/0069942 A1 * | 3/2007 | Hanneman | ............... | 342/33 |

OTHER PUBLICATIONS

EP Search Report, 06121283.3, Mar. 2, 2007.

* cited by examiner

*Primary Examiner*—Thomas G. Black
*Assistant Examiner*—Shelley Chen
(74) *Attorney, Agent, or Firm*—Igrassia, Fisher & Lorenz, P.C.

(57) ABSTRACT

A method of removing undesired signals in an aviation guidance system may include receiving at least one first desired signal having a first frequency of amplitude modulation, receiving at least one second desired signal having a second frequency of amplitude modulation, and receiving at least one undesired signal having any frequency including a frequency that is substantially the same as or a subharmonic of at least one of the first and second desired signals. The first and second frequencies of amplitude modulation are phase synchronous, and the undesired signals are non-synchronous with at least one of the first and second desired signals. The method may also include identifying the undesired signals and removing the undesired signals.

20 Claims, 2 Drawing Sheets

SYSTEMS AND METHODS FOR REMOVING UNDESIRED SIGNALS IN INSTRUMENT LANDING SYSTEMS

FIELD

The present invention generally relates to aviation guidance systems and methods for removing undesired signals in aviation guidance systems. More particularly, the invention relates to systems and methods for minimizing localizer and glideslope errors in aviation guidance systems.

BACKGROUND

An instrument landing system (ILS) is a ground-based transmission system that provides runway approach information to aircraft. Some conventional systems comprise a localizer subsystem and a glide slope subsystem. The localizer subsystem provides lateral guidance to aircraft for tracking the runway centerline. The glide slope subsystem provides vertical guidance to aircraft for descending at the proper glide path.

Conventional localizer subsystems include a localizer antenna array that radiates a signal comprising an RF carrier amplitude modulated with equal amplitudes of 90 Hz and 150 Hz tones. The localizer receiver resides with the aircraft. The localizer radiation patterns are normally arranged such that the 90 Hz and 150 Hz tones will have equal levels when the receiving aircraft is on the runway centerline and extention thereof.

Similarly, conventional glide slope subsystems include a glide slope antenna array that radiates a signal comprising an RF carrier amplitude modulated with equal amplitudes of 90 Hz and 150 Hz tones. The glide slope resides with the aircraft. The glide slope radiation patterns are normally arranged such that the 90 Hz and 150 Hz tones will have equal levels when the receiving aircraft is descending at the desired glide path angle, which is typically referenced at three degrees.

However, some conventional instrument landing systems, including conventional localizer and glide slope systems, may be implemented on aircraft that generate propeller or rotor modulation effects and/or observe multipath effects, which can introduce errors into the ILS. For example, errors may be introduced when the propeller or rotor modulation frequency or the multipath frequency is approximately 90 Hz or 150 Hz (i.e., the same as either one of the localizer and glide slope tones of the ILS) or a subharmonic of 90 Hz or 150 Hz (e.g., 15, 30, 37.5, 45, or 75 Hz). Such errors can cause the aircraft to oscillate or fly an offset course.

Accordingly, it may be desirable to provide an instrument landing system capable of removing undesired modulation effects such as, for example, propeller or rotor modulation effects.

SUMMARY

In accordance with various aspects of the disclosure, a method of removing undesired signals in an aviation guidance system may comprise receiving at least one first desired signal having a first frequency of amplitude modulation, receiving at least one second desired signal having a second frequency of amplitude modulation, and receiving at least one undesired signal having any frequency including a frequency that is substantially the same as or a subharmonic of at least one of the first and second desired signals. The first and second frequencies of amplitude modulation are phase synchronous, and the undesired signals are non-synchronous with at least one of the first and second desired signals. The method may also include identifying the undesired signals and removing the undesired signals.

In accordance with some aspects of the disclosure, an aviation guidance system may comprise at least one receiver configured to receive at least one first desired signal having a first frequency of amplitude modulation and at least one second desired signal having a second frequency modulation. The first and second frequencies of amplitude modulation are phase synchronous. The system may further comprise a controller configured to identify and remove undesired signals received by the receiver. The undesired signals may have any frequency including frequencies that are substantially the same as or subharmonics of at least one of the first and second desired signals, but are non-synchronous with at least one of the first and second desired signals.

According to various aspects of the disclosure, a method of minimizing localizer and glide slope errors in an aviation guidance system may comprise receiving at least one first desired signal having a first frequency of amplitude modulation, receiving at least one second desired signal having a second frequency of amplitude modulation, and receiving undesired signals having any frequency including frequencies that are substantially the same as or subharmonics of at least one of the first and second desired signals. The first and second desired signals may represent at least one of localizer information and glide slope information for an aircraft. The first and second frequencies of amplitude modulation are phase synchronous, but the undesired signals are non-synchronous with at least one of the first and second desired signals. The undesired signals may include propeller modulation, rotor modulation, and/or multipath. The method may further comprise comparing amplitude and phase of the first and second desired signals and the at least one undesired signal, determining which of the desired and undesired signals are non-synchronous, and removing the undesired signals.

BRIEF DESCRIPTION OF THE DRAWINGS

The accompanying drawings, which are incorporated in and constitute a part of this specification, illustrate at least one exemplary embodiment of the invention. In the drawings.

DESCRIPTION OF THE VARIOUS EMBODIMENTS

Figure 1:
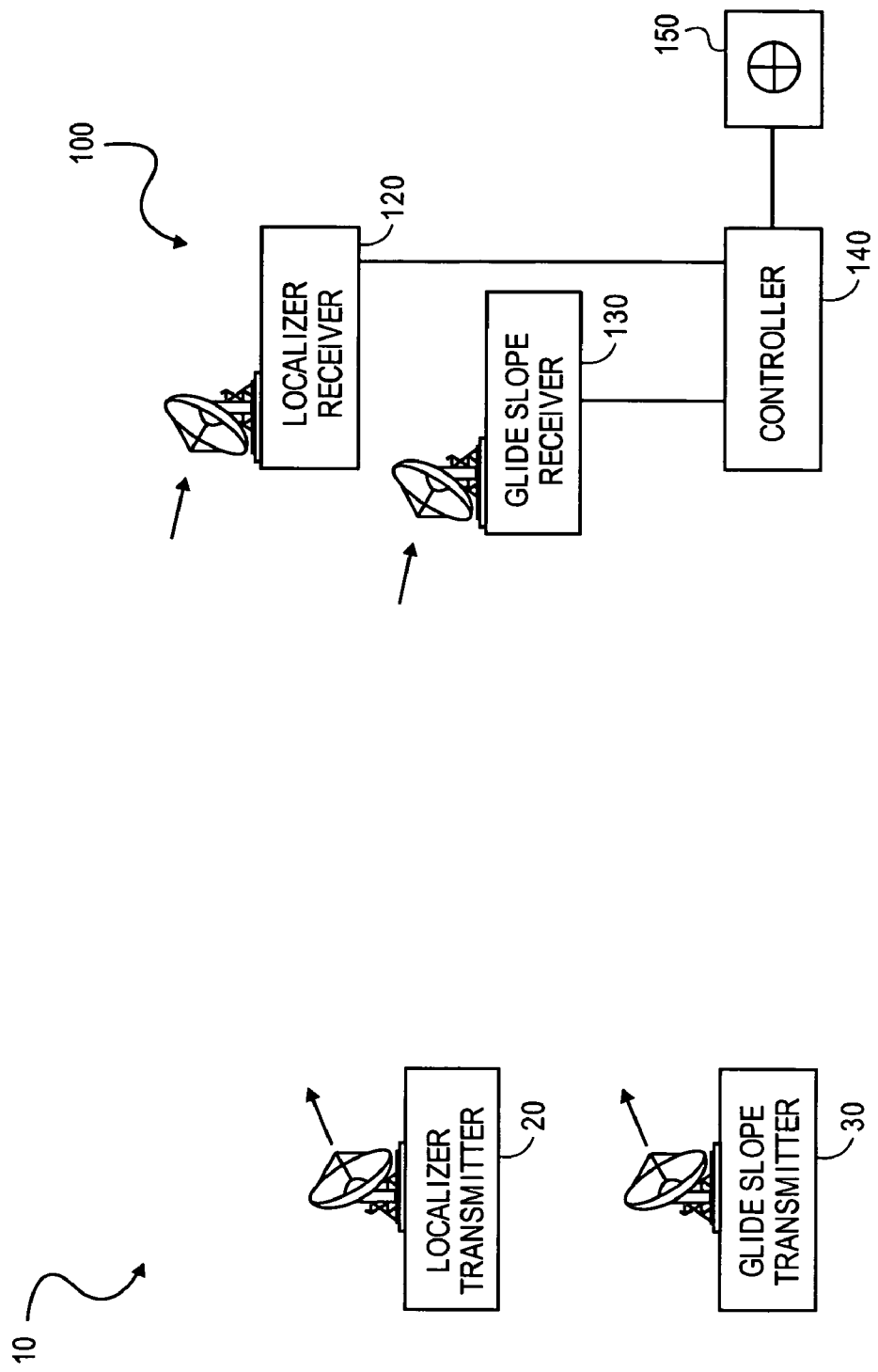
FIG. 1 is a block diagram of an exemplary system for removing undesired signals in instrument landing systems in accordance with various aspects of the disclosure.

Reference will now be made in detail to exemplary embodiments of the invention, examples of which are illustrated in the accompanying drawings. Wherever possible, the same reference numbers are used in the drawings and the description to refer to the same or like parts.

FIG. 1 illustrates an exemplary aviation guidance system 100 in accordance with various aspects of the disclosure. The aviation guidance system 100 may comprise a portion of an instrument landing system (ILS) 10. The ILS 10 may comprise one or more localizer transmitters 20 at a landing site, one or more glide slope transmitters 30 at the runway landing site, and the aviation guidance system 100. Each of the transmitters 20, 30 may comprise a highly directional transmitting system.

The aviation guidance system 100 may comprise a localizer receiver 120 and a glide slope receiver 130 associated with an aircraft (not shown). It should be appreciated that the localizer and glide slope receivers 120, 130 may be contained within the same physical unit or in separate units. According to various aspects, the localizer receiver 120 may be configured to receive signals from at least one localizer transmitter 20 at the landing site, and the glide slope receiver 130 may be configured to receive signals from at least one glide slope transmitter 30 at the landing site. It should be appreciated that the localizer and glide slope transmitters 20, 30 may be arranged in any configuration known to persons skilled in the art.

The guidance system 100 may also include a controller 140 configured to process the signals received by the localizer and glide slope receivers 120, 130 and a display 150, for example, a course deviation indicator (CDI), configured to provide guidance information to a pilot, co-pilot, navigator, or the like.

The localizer and glide slope transmitters 20, 30 each radiate an ILS signal modulated with two equal level, phase-locked, audio tones—a 90 Hz tone and a 150 Hz tone. Any of various known antenna radiation patterns may be used to modify the modulation of the ILS signal so that the 90 Hz and 150 Hz tones have different levels at different points in the pattern, thereby creating an approach corridor decipherable by the localizer and glide slope receivers 120, 130.

In addition to receiving the desired signals from the localizer and glide slope transmitters 20, 30, the localizer and glide slope receivers 120, 130 may receive undesired signals having a frequency of 90 Hz or 150 Hz or a subharmonic of 90 Hz or 150 Hz such as, for example, 15, 30, 37.5, 45, or 75 Hz. Such undesired signals may be caused by propeller or rotor modulation and/or by multipath effects. The controller 140 may be configured to remove these undesired signals.

For example, the controller 140 may be configured to scrutinize the phase relationship of all received signals having a frequency of 90 Hz±2.5% and 150 Hz±2.5%, i.e., substantially 90 Hz and 150 Hz. The controller 140 can identify any signals at substantially 90 Hz and/or 150 Hz that are not phase locked; that is, any signals that are non-synchronous. The controller 140 can then remove these undesired non-synchronous signals using any known signal processing technique such as, for example, analog notch filtering, bandpass filtering, fast Fourier transforms, or the like.

Once the undesired signals are removed, the controller 140 can compare the levels of the 90 Hz and 150 Hz tones for both the localizer and glide slope subsystems. Based on the comparative levels of the tones, the controller 140 can determine the course of the aircraft and provide feedback to a pilot, co-pilot, navigator, or the like via the display 150.

Figure 2:
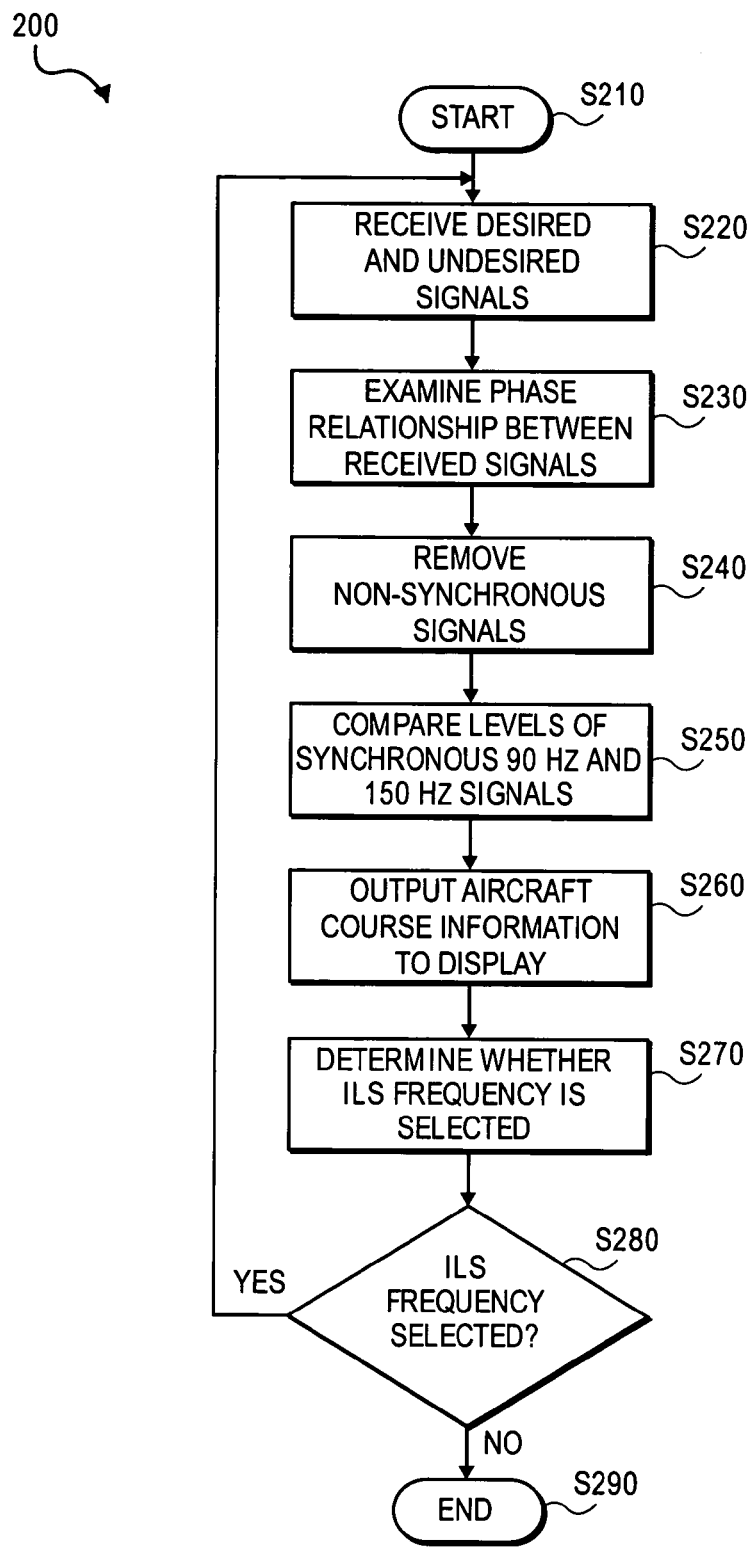
FIG. 2 is a flow chart of an exemplary method for removing undesired signals in instrument landing systems in accordance with various aspects of the disclosure.

Referring now to FIG. 2, an exemplary method 200 for removing undesired signals in an ILS 10 may commence in step S210. Control proceeds to step 220, where the localizer and glide slope receivers 120,130 receive desired and undesired signals. As discussed above, the desired signals include the 90 Hz and 150 Hz tones from both the localizer and glide slope transmitters 20, 30, and the undesired signals include propeller or rotor modulation effects and/or multipath effects. Control continues to step S230.

Next, in step S230, controller 140 examines the phase-relationship between the desired and undesired signals and determines which signals are synchronous (i.e., phase-locked) and which are non-synchronous. Control then proceeds to step S240, where the controller 140 removes any non-synchronous signals. As described above, the phase-locked 90 Hz and 150 Hz tones from both the localizer and glide slope transmitters 20, 30 are retained and the undesired signals resulting from propeller or rotor modulation effects and/or multipath effects are removed. The undesired non-synchronous signals may be removed using any known signal processing technique such as, for example, analog notch filtering, bandpass filtering, fast Fourier transforms, or the like. Control continues to step S250.

In step S250, the controller 140 compares the levels of the phase-locked 90 Hz and 150 Hz tones received the localizer and glide slope receivers 120, 130 and determines the course of the aircraft approaching the landing site runway. Control proceeds to step S260, where the controller 140 outputs the course information to a display 150, such as a CDI. A pilot, co-pilot, navigator, or the like can interpret the information provided by the display and adjust the aircraft's course as needed. Control then continues to step S270.

Next, in step S270, the controller 140 determines whether the aircraft receiver is continuing to be tuned to an ILS frequency. Then, in step S280, if the controller 140 determines that the aircraft is continuing to be tuned to an ILS frequency, control returns to step S220. Otherwise, if the controller 140 determines that the aircraft receiver is no longer being tuned to an ILS frequency (i.e., the aircraft has either landed or discontinued approach), control proceeds to step S290 and ceases.

In operation, the localizer transmission pattern may be arranged such that the 90 Hz and 150 Hz tones will have equal levels along an extended runway centerline of the landing site. Thus, as an aircraft approaches the runway along the extended centerline, the controller 140 will remove undesired signals at about 90 Hz and/or 150 Hz and determine that there is no difference between the level of the desired localizer signals. Thus, the CDI will display no difference in the depth of modulation between the 90 Hz and 150 Hz tones. That is, the CDI needle will be centered to indicated that the aircraft is approaching the runway substantially along the centerline.

As persons skilled in the art would recognize, the approach information transmitted by the ILS is in the difference of the modulation of the 90 Hz and 150 Hz tones. This difference is called the difference of the depth of modulation, or DDM, and is the modulation factor of one tone subtracted from the modulation factor of the other tone. Modulation factor is the ratio of the audio peak voltage to the RF level, and is described by the formula Va/Vc, where Va is the peak amplitude of the audio, and Vc is the amplitude of the unmodulated carrier. Percent modulation is the modulation factor multiplied by 100. The localizer transmitted signal has the audio modulated at 20 percent per tone. This means that the 90 Hz is at a modulation factor of 0.2000 and the 150 Hz is at a modulation factor of 0.200. This condition of equal modulation is called modulation balance. The DDM in this condition is 0.200 minus 0.200, or 0.000 DDM. In the radiation pattern, this is the condition on runway centerline. The total percent modulation is the sum of the modulation factors times 100, or (0.200+0.200)×100=40%.

According to various aspects, if the aircraft on approach is to the left of the runway centerline, the controller 140 will remove undesired signals at about 90 Hz and/or 150 Hz and determine that the level of the 90 Hz tone exceeds that of the 150 Hz tone. As a result, the controller 140 will produce a deflection on the CDI to the right, indicating that the aircraft's course needs to be altered to the right. If the aircraft on approach is to the right of the runway centerline, the controller 140 will remove undesired signals at about 90 Hz and/or 150 Hz and determine that the level of the 150 Hz tone exceeds that of the 90 Hz tone. As a result, the controller 140 will produce a deflection on the CDI to the left, indicating that the aircraft's course needs to be altered to the left.

The glide slope transmission pattern may be arranged such that the 90 Hz and 150 Hz tones will have equal levels along a desired glide path angle referenced at, for example, three degrees. Thus, as an aircraft approaches the runway along the desired glide path angle, the controller 140 will remove undesired signals at about 90 Hz and/or 150 Hz and determine that there is no difference between the level of the desired glide slope signals. Thus, the CDI will display no difference in the DDM between the 90 Hz and 150 Hz tones. That is, the CDI needle will be centered to indicated that the aircraft is approaching the runway substantially at the desired glide path angle.

According to some aspects, if the aircraft on approach is above the desired glide path angle, the controller 140 will remove undesired signals at about 90 Hz and/or 150 Hz and determine that the level of the 90 Hz tone exceeds that of the 150 Hz tone. As a result, the controller 140 will produce a downward deflection on the CDI, indicating that the aircraft's course needs to be altered in the downward direction. If the aircraft on approach is below the desired glide path angle, the controller 140 will remove undesired signals at about 90 Hz and/or 150 Hz and determine that the level of the 150 Hz tone exceeds that of the 90 Hz tone. As a result, the controller 140 will produce an upward deflection on the CDI, indicating that the aircraft's course needs to be altered in an upward direction.

It should be appreciated that the localizer transmitter 20 may operate on one of the forty (40) ILS channels within the frequency range 108.10 MHz to 111.95 MHz. The glide slope transmitter 30 may operate on one of the forty (40) ILS channels within the frequency range 329.15 MHz to 335 MHz. It should be appreciated that the localizer and glide slope carrier frequencies may be paired with one another so that a pilot, co-pilot, navigator, or the like has to tune only one receiver control.

It will be apparent to those skilled in the art that various modifications and variations can be made to the structure. Thus, it should be understood that the invention is not limited to the examples discussed in the specification. Rather, the present invention is intended to cover modifications and variations.

What is claimed is:

1. A method of removing undesired signals in an aviation guidance system, comprising:
   receiving a localizer signal having a first phase;
   receiving a glide slope signal having the first phase;
   receiving an undesired signal having a second phase non-phase synchronous with the first phase of the localizer and glide slope signals;
   comparing a phase relationship between the localizer and glide slope signals, and the undesired signal to identify the undesired signal; and
   removing the undesired signal.

2. The method of claim 1, wherein said removing comprises signal processing.

3. The method of claim 2, wherein said signal processing comprises using at least one of an analog filter, a digital signal processor, and a Fast Fourier Transform.

4. The method of claim 1, wherein the localizer and glide slope signals each include navigation tones having a first frequency of about 90 Hz and a second frequency of about 150 Hz.

5. The method of claim 1, wherein the first and second desired signals represent at least one of localizer information and glide slope information for an aircraft.

6. The method of claim 1, wherein the undesired signal includes at least one of propeller modulation, rotor modulation, and multipath.

7. A recording medium having computer executable program code for performing the method of removing undesired signals in an aviation guidance system as claimed in claim 1.

8. The method of claim 1, further including: determining whether an aircraft receiver is continuing to be tuned to an instrument landing system (ILS) frequency.

9. An aviation guidance system, comprising:
   a receiver configured to receive a localizer signal having a first phase, a glide slope signal having the first phase, and an undesired signal having a second phase non-synchronous with the first phase of the localizer and glide slope signals; and
   a controller configured to compare a phase relationship between the localizer and glide slope signals, and the undesired signal to identify the undesired signal, and remove the undesired signal.

10. The system of claim 9, wherein the controller comprises a signal processor, and the receiver comprises a first receiver configured to receive the localizer signal and a second receiver configured to receive the glide slope signal.

11. The system of claim 10, wherein said signal processer comprises at least one of an analog filter, a digital signal processor, and a Fast Fourier Transform.

12. The system of claim 9, wherein the localizer and glide slope signals each include navigation tones having a first frequency of about 90 Hz and a second frequency of about 150 Hz.

13. The system of claim 9, wherein the localizer and glide slope signals represent at least one of localizer information and glide slope information for an aircraft.

14. The system of claim 9, wherein the undesired signal includes at least one of propeller modulation, rotor modulation, and multipath.

15. The system of claim 9, wherein the controller determines whether an aircraft receiver is continuing to be tuned to an instrument landing system (ILS) frequency.

16. A method of minimizing localizer and glide slope errors in an aviation guidance system, comprising:
   receiving a localizer signal representative of localizer information for an aircraft, the localizer signal having a first phase;
   receiving a glide slope signal representative of glide slope information for an aircraft, the glide slope signal having the first phase;
   receiving an undesired signal having a second phase non-phase synchronous with the first phase of the localizer and glide slope signals, the undesired signal including propeller modulation, rotor modulation, or multipath;
   comparing a phase relationship between the localizer and glide slope signals, and the undesired signal for a referenced glide path angle to identify the undesired signal; and
   removing the undesired signal.

17. The method of claim 16, wherein said removing comprises signal processing.

18. The method of claim 17, wherein said signal processing comprises using at least one of an analog filter, a digital signal processor, and a Fast Fourier Transform.

19. The method of claim 16, wherein the localizer and glide slope signals each include navigation tones having a first frequency of about 90 Hz and a second frequency of about 150 Hz.

20. A recording medium having computer executable program code for performing the method of removing undesired signals in an aviation guidance system as claimed in claim 16.

* * * * *